United States Patent [19]

Pipper et al.

[11] Patent Number: 4,540,772

[45] Date of Patent: Sep. 10, 1985

[54] CONTINUOUS PREPARATION OF NYLON FROM AQUEOUS SALT SOLUTION IN PRECONDENSATION ZONE HAVING BAFFLES

[75] Inventors: Gunter Pipper, Bad Durkheim; Franz Schmidt, Mannheim; Rainer Theysohn, Frankenthal; Siegfried Riegger, Ettenheim; Eduard Heil; Hermann Fischer, both of Limburgerhof; Richard Thoma, Battenberg; Paul Matthies, Heidelberg, all of Fed. Rep. of Germany

[73] Assignee: BASF Aktiengesellschaft, Fed. Rep. of Germany

[21] Appl. No.: 620,837

[22] Filed: Jun. 15, 1984

[30] Foreign Application Priority Data

Jun. 15, 1983 [DE] Fed. Rep. of Germany ....... 3321579

[51] Int. Cl.$^3$ .............................................. C08G 69/28
[52] U.S. Cl. ...................................... 528/335; 526/68; 526/71
[58] Field of Search ..................... 528/335; 526/68, 71

[56] References Cited

U.S. PATENT DOCUMENTS

| 3,269,990 | 8/1966 | Wiloth et al. | 260/78 |
| 3,296,217 | 1/1967 | Tate | 260/78 |
| 3,900,450 | 8/1975 | Jaswal et al. | 260/78 |
| 3,948,862 | 4/1976 | Iwasyk | 260/78 |
| 4,019,866 | 4/1977 | Jaswal et al. | 23/260 |

*Primary Examiner*—Harold D. Anderson
*Attorney, Agent, or Firm*—Keil & Weinkauf

[57] ABSTRACT

Nylons are prepared by a continuous process in which, in a precondensation zone, an aqueous solution of a salt of a dicarboxylic acid of 6 to 18 carbon atoms and a diamine of 6 to 18 carbon atoms is heated to 250°–300° C. under superatmospheric pressure, with simultaneous vaporization of water and formation of a prepolymer, the prepolymer and the vapor are separated, and the former is fed into a polycondensation zone and condensed under superatmospheric pressure of from 1 to 10 bar and at from 250° to 300° C., wherein the aqueous salt solution is condensed under superatomspheric pressure of from 1 to 10 bar in the first third of the tubular precondensation zone provided with baffles, until the degree of conversion is not less than 93%, and the prepolymer and the vapor phase are brought into intimate contact with one another in the remaining two thirds of the precondensation zone.

9 Claims, No Drawings

CONTINUOUS PREPARATION OF NYLON FROM AQUEOUS SALT SOLUTION IN PRECONDENSATION ZONE HAVING BAFFLES

A number of processes for the preparation of nylons from salts of dicarboxylic acids and diamines, eg. nylon-6,6 salt are known. German Published Application DAS No. 1,162,562 describes a process in which an aqueous solution of nylon-6,6 salt is first heated to a temperature below the boiling point under from 18 to 50 atm gage pressure, the heated solution is fed under the surface of a nylon melt, and water is separated off. In another process, disclosed in German Laid-Open Application DOS No. 1,570,932, the aqueous nylon-6,6 salt solution is first preheated without vaporization of water and is fed into the lower part of a column, water is evaporated, and the resulting salt melt is condensed in a downstream zone. The vapors produced in this procedure are rectified in the upper part of the column and the entrained diamines are recycled. German Laid-Open Application DOS No. 2,410,474 describes a process in which an aqueous solution of nylon-6,6 salt is fed into a nylon melt, and the mixture is heated in a heat exchanger, with formation of vapor, and is passed into the lower part of a column, where vapor and prepolymer separate. The prepolymer condenses at the bottom of the column, and some of it is recycled. The vapors are rectified in the upper part of the column, and the diamines present in them are recycled.

U.S. Pat. No. 3,948,862 discloses a process in which the condensation is carried out in a widening tube which is divided, by means of valves, into zones which may furthermore contain baffles. How the content of triamines can be reduced is not stated.

The prior art processes are in need of further improvement. The quality of the nylons has to meet steadily increasing requirements as a result of the further development of spinning technology. In particular, it is desirable to reduce breaks and knot formation during spinning and to minimize changes in viscosity during processing. It is also the intention to improve the achievable draw ratio and the strength of the filaments produced. It has been found that the formation of triamines, eg. dihexamethylenetriamine from hexamethylenediamine, has an adverse effect on the quality of the polymer.

It is an object of the present invention to provide a continuous process for the preparation of nylons which gives nylons which, when processed to filaments, exhibit an improvement in respect of breaking, knot formation and achievable draw ratio and strength of the filaments. It is a particular object of the present invention to keep the formation of triamines during the polycondensation, and the vaporization of diamines, to a minimum.

We have found that this object is achieved by a process for the continuous preparation of nylons, in which, in a precondensation zone, an aqueous solution of a salt of a dicarboxylic acid of 6 to 18 carbon atoms and a diamine of 6 to 18 carbon atoms is heated to 250°–300° C. under superatmospheric pressure, with simultaneous vaporization of water and formation of a prepolymer, the prepolymer and the vapor are separated, and the former is fed into a polycondensation zone and condensed under superatmospheric pressure of from 1 to 10 bar and at from 250° to 300° C., wherein the aqueous salt solution is condensed under superatmospheric pressure of from 1 to 10 bar in the first third of the tubular precondensation zone provided with baffles, until the degree of conversion is not less than 93%, and the prepolymer and the vapor phase are brought into intimate contact with one another in the remaining two thirds of the precondensation zone.

The novel process has the advantage that the resulting nylons exhibit improved properties during processing to filaments. In particular, the novel process has the advantage that the formation of triamines, eg. dihexamethylenetriamine, and the vaporization of diamines are reduced.

In accordance with the invention, an aqueous solution of a salt of a dicarboxylic acid of 6 to 18 carbon atoms and a diamine of 6 to 18 carbon atoms is used.

An aqueous solution of a salt of an $\alpha,\omega$-alkanedicarboxylic acid of 6 to 12 carbon atoms and an $\alpha,\omega$-alkanediamine of 6 to 12 carbon atoms, particularly one which has a straight carbon chain, is preferably used as the starting material. Examples of suitable dicarboxylic acids are azelaic acid, adipic acid, suberic acid, sebacic acid, decanedicarboxylic acid, terephthalic acid and naphthalenedicarboxylic acid. Preferred $\alpha,\omega$-alkanedicarboxylic acids have 6 to 10 carbon atoms.

Examples of suitable diamines are hexamethylenediamine, octamethylenediamine, decamethylenediamine, bis(4-aminocyclohexyl)-methane, bis(4-amino-3-methylcyclohexyl)methane and 2,2-bis(4-aminocyclohexyl)propane. Preferred $\alpha,\omega$-alkanediamines have 6 to 10 carbon atoms.

Nylon-6,6, nylon-6,9, nylon-6,10 and nylon-6,12 salts, especially nylon-6,6 salt, have become particularly important. The aqueous solution used contains as a rule from 30 to 70, in particular from 50 to 65, % by weight of the salt. The dicarboxylic acid and the diamine are of course present in the salt essentially in equivalent amounts.

It is also possible concomitantly to use lactams, in particular caprolactam, in order to produce a copolymer.

According to the invention, the aqueous salt solution is advantageously passed continuously, at from 50° to 100° C., into a tubular precondensation zone provided with baffles. In the first third of this zone, the aqueous salt solution is heated under superatmospheric pressure of from 1 to 10 bar and at from 250° to 300° C., with a simultaneous vaporization of water and formation of a prepolymer. Advantageously, superatmospheric pressure of from 2 to 6 bar is employed and heating is carried out at from 270° to 290° C. The temperature employed must of course be above the melting point of the particular polymer being prepared. The first third of the precondensation zone is supplied with sufficient heat to achieve a degree of conversion of not less than 93%, in particular from 95 to 98%.

The precondensation zone is advantageously in the form of a tube bundle, the tubes being provided with baffles in order to create a large surface area. This is achieved by, for example, introducing packing, such as Raschig rings, metal rings or, in particular, wire net packings. Advantageously, the free surface area is from 0.7 to 1.5 m² per liter of reaction space.

In the remaining two thirds of the precondensation zone, the prepolymer and the vapor phase are brought into intimate contact with one another. As a result, the amount of diamine liberated with the steam is substantially reduced. The temperature and pressure conditions are of course the same as those at the end of the first third of the precondensation zone. However, the heat supplied by means of the heat-transfer agent is just sufficient to maintain the temperature. Advantageously, the total residence time in the precondensation zone is from 1 to 15, in particular from 3 to 10, minutes.

The two-phase mixture consisting of vapors and prepolymer and emerging from the precondensation zone is separated. Separation takes place as a rule spontaneously as a result of the physical difference in a vessel, the lower part of the vessel advantageously being in the form of a polymerization zone. The vapors obtained essentially consist of steam and diamines, which are released when the water is vaporized. These vapors are advantageously passed into a column and rectified. Examples of suitable columns are packed columns, bubble-tray columns or sieve-tray columns containing from 5 to 15 theoretical plates. The column is advantageously operated under the same pressure conditions as the precondensation zone. The diamines present in the vapors are separated off in this column, and are recycled to the precondensation zone. It is also possible to feed the diamines to the downstream polymerization zone. The rectified steam is taken off at the top of the column.

Depending on its degree of conversion, the resulting prepolymer consists of a low molecular weight nylon and residual amounts of unreacted salts, and as a rule has a relative viscosity of from 1.2 to 2.0. This prepolymer is fed into a polymerization zone, and the melt obtained in this zone is subjected to polycondensation at from 250° to 300° C., in particular from 270° to 290° C., and under superatmospheric pressure of from 1 to 10, in particular from 2 to 6, bar. Advantageously, the vapors liberated in this zone are rectified in the column, together with the vapors mentioned above. The residence time in the polycondensation zone is preferably from 5 to 30 minutes. The nylon thus obtained generally has a relative viscosity of from 1.7 to 2.3, and is discharged continuously from the condensation zone.

In a preferred procedure, the nylon thus obtained is passed, in the form of a melt, through a discharge zone, the water present in the melt being removed simultaneously. Examples of suitable discharge zones are devolatilizing extruders. The melt which has been freed in this way from water is then extruded and granulated. The resulting granules are condensed in the solid phase using superheated steam at, for example, from 170° to 225° C., until the desired viscosity is obtained. It is advantageous to use the steam obtained at the top of the column for this purpose.

In another preferred procedure, the nylon melt discharged from the polycondensation zone is passed into a further condensation zone where it is condensed with continuous formation of new surfaces, at from 270° to 290° C., advantageously under reduced pressure, eg. from 1 to 500 mbar, until the desired viscosity is obtained. Suitable apparatuses are known as finishers.

Conventional additives, such as dulling agents, eg. titanium dioxide, or stabilizers can be fed to the aqueous salt solution, for example as a suspension in water, at the entrance to the precondensation zone, or in the form of a concentrate during the course of the polycondensation.

The nylons prepared by the process of the invention are useful for the production of filaments, fibers, films and shaped articles.

The Example which follows illustrates the process according to the invention.

EXAMPLE 1

A 62% strength by weight solution of nylon-6,6 salt is fed from below into a 3 m long vertical tube by means of a metering pump, at 80° C. and at a rate corresponding to 5 kg/hour of nylon. The tube is filled with Raschig rings and has a free surface area of about 2 m². In the first third of the tube, the water used as the solvent and the major part of the water liberated during the reaction are vaporized by heating to 280° C., and a degree of conversion of not less than 93% is reached. In the remaining part of the tube, intimate mass transfer between the hexamethylene-diamine-containing steam and the prepolymer takes place. The temperature of the prepolymer is 278° C. The mixture consisting of precondensate and steam and emerging from the precondensation zone is separated, in a separator, into steam and a melt. The separator serves as the polycondensation zone, and the melt remains there for a further 10 minutes, after which it is extruded by means of an extruder equipped with a devolatilizing zone, and the extrudates are solidified in a water bath and then granulated.

The separator is kept under a pressure of 5 bar by means of a pressure-regulating unit downstream from the column. The same pressure is of course maintained in the precondensation zone. The steam separated off in the separator is fed into a packed column which possesses about 10 theoretical plates and to the top of which about 1.0 liter/hour of water is fed in order to produce a reflux. A temperature of 152° C. is established at the top of the column. The steam emerging downstream from the pressure-relief valve is condensed. It contains less than 0.05% by weight of hexamethylenediamine. The aqueous hexamethylenediamine solution obtained at the bottom of the column contains from 2 to 3%, based on nylon, of hexamethylenediamine, and is recycled to the precondensation zone, together with the aqueous solution of nylon-6,6 salt. The residence time in the precondensation zone is about 9 minutes. The precondensate contains from 0.05 to 1.0°/$_{oo}$ of bishexamethylenetriamine. After the melt has emerged from the separator, the polymer contains 0.15°/$_{oo}$ of bishexamethylenetriamine and has a relative viscosity of 1.9, and the ratio of the number of equivalents of COOH terminal groups to the number of equivalents of NH$_2$ terminal groups is 109:107. The range of variation of terminal groups is small.

In the extruder, the melt is let down to atmospheric pressure, and virtually no further condensation takes place during a residence time of less than 1 minute. The resulting granules are subjected to continuous solid-phase condensation with superheated steam at 182° C. during a residence time of 12 hours, until the final viscosity $\eta$ rel is 2.50.

We claim:
1. A process for the continuous preparation of a nylon, which comprises
    (a) passing an aqueous solution of a salt of a dicarboxylic acid of 6 to 18 carbon atoms and a diamine of 6 to 18 carbon atoms through a tubular precondensation zone possessing baffles,
    (b) heating the aqueous solution in the first third of the precondensation zone to 250°–300° C. under superatmospheric pressure of from 1 to 10 bar, with the formation of a vapor phase containing steam and diamines and not less than 93% conversion of the salt to form a prepolymer,

(c) bringing the vapor phase into intimate contact with the prepolymer in the remaining two thirds of the precondensation zone,
(d) separating off the prepolymer from the vapor phase,
(e) transferring the prepolymer to a condensation zone, and
(f) condensing the prepolymer in the condensation zone under superatmospheric pressure of from 1 to 10 bar and at from 250° to 300° C.

2. A process as claimed in claim 1, wherein a residence time of from 1 to 15 minutes is maintained in the precondensation zone.

3. A process as claimed in claim 1, wherein the precondensation zone is charged with packing.

4. A process as claimed in claim 1, wherein the degree of conversion of the product emerging from the precondensation zone is maintained at from 95 to 98%.

5. A process as claimed in claim 1, wherein, on emerging from the precondensation zone, the prepolymer has a water content of from 0.2 to 5% by weight.

6. A process as claimed in claim 1, wherein the vapor formed is rectified in a column under the pressure employed in the precondensation, and the diamines present in the vapors are separated off and are recycled to the precondensation zone.

7. A process as claimed in claim 1, wherein the nylon, in the form of a melt, is passed from the polycondensation zone through a discharge zone with removal of water, and is granulated and then condensed in the solid phase until the desired viscosity is obtained.

8. A process as claimed in claim 1, wherein the nylon discharged in the form of a melt from the polycondensation zone is condensed in a further condensation zone, with continuous formation of new surfaces, until the desired viscosity is obtained.

9. A process for the preparation of a nylon, which comprises
(a) passing an aqueous solution of a salt of a dicarboxylic acid of 6 to 18 carbon atoms and a diamine of 6 to 18 carbon atoms through a tubular precondensation zone possessing baffles,
(b) heating the aqueous solution in the first third of the precondensation zone to 250°–300° C. under superatmospheric pressure of from 1 to 10 bar, with the formation of a vapor phase containing steam and diamines and not less than 93% conversion of the salt to form a prepolymer,
(c) bringing the vapor phase into intimate contact with the prepolymer in the remaining two thirds of the precondensation zone,
(d) separating off the prepolymer from the vapor phase,
(e) transferring the prepolymer to a condensation zone,
(f) condensing the prepolymer in the condensation zone under superatmospheric pressure of from 1 to 10 bar and at from 250° to 300° C.,
(g) rectifying the vapor obtained in stage (d) in a column under the pressure used for the precondensation, thus separating the vapor into steam and diamine, and
(h) discharging the nylon obtained in stage (f) through a discharge zone with removal of water, cooling and comminuting the nylon, and condensing the nylon in the solid phase, with the steam separated off in stage (g), until the desired viscosity is obtained.

* * * * *